Figure 1:
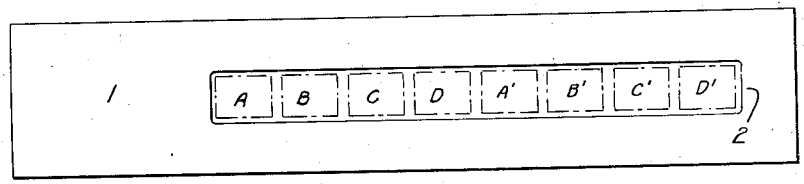

Aug. 9, 1949.                F. H. AVERS ET AL                2,478,556
                            STEREOSCOPIC VIEWER

Original Filed June 7, 1942

INVENTORS.
FRANKLIN H. AVERS
EDWARD C. KREBS

BY Charles A. Darius

ATTORNEY.

Patented Aug. 9, 1949

2,478,556

UNITED STATES PATENT OFFICE 2,478,556

STEREOSCOPIC VIEWER

Franklin H. Avers, Portage, and Edward C. Krebs, Evansville, Wis., assignors to George P. Krebs, trustee Original application June 7, 1942, Serial No. 446,048, now Patent No. 2,385,183, dated September 18, 1945. Divided and this application August 21, 1945, Serial No. 611,776

2 Claims. (Cl. 88—31)

1

This application is a division of a co-pending application Serial No. 446,048, filed June 7, 1942, issued as U. S. Patent #2,385,183, September 18, 1945. This division relates to a part of said co-pending application referred to which is concerned with stereoscopic film photographs made according to the methods and principles as disclosed in that application.

The main object of the instant divisional application is to provide suitable and convenient means for viewing such or similar pictures after mounting upon a slide in a manner and form as will further appear.

It is a further object to provide as a separate unit, a stereoscope adapted for viewing such slides as illuminated transparencies.

Further more specific objects and means provided for carrying out the objectives and purposes of the invention will be better understood by reference to the accompanying drawings which constitute a part of this specification. They illustrate one co-ordinated preferred form of mechanism and instrumentalities for utilizing and viewing stereoscopic pictures of the kind herein described and disclosed. Similar reference numerals indicate the same parts throughout the several figures.

Figure 1 of the drawings herein depicts a mounted slide in which are mounted a multiplicity of stereoscopic pairs of transparencies derived from a twin lens camera constructed in accordance with the principles and teachings of the co-pending application.

Figure 2:
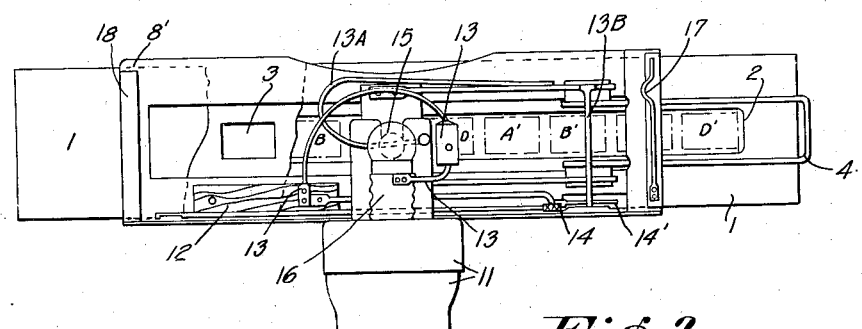
Figure 3:
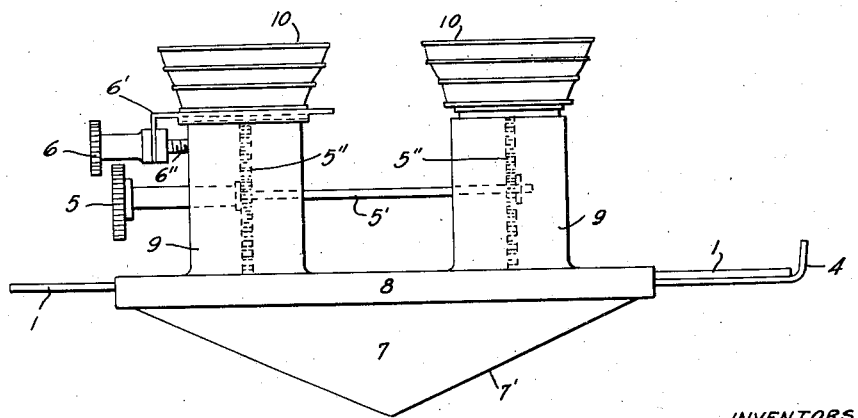

Figures 2 and 3 present different aspects of a preferred form of construction of the stereoscope adapted for stereoscopic viewing of such slides of the type as illustrated in Figure 1 and wherein the exposed and developed cinema films are translucent positive pictures which may be seen as positives by transmitted light.

The film strips are appropriately mounted as shown for stereoscopic viewing in an oblong cardboard or metal slide or frame 1 into which a longitudinal window has been cut and into which the paired sections of the film 2 may be set for viewing by transmitted light.

The window and the cut-out film-strip may then be placed somewhat off center and nearer one end, thus leaving a wider margin at the other end as shown in Figure 1 for better manual control.

As will be seen from the strip of film as mounted in the slide, the picture of each frame has its altitude lying transversely of the linear course of the ribbon of film (in the same manner as the paired letters of designation AA', BB', etc.), and with each twin frame picture being the fourth from its companion; when, as illustrated, there are four doubles to a slide set.

In the form of stereoscope adapted for viewing the new form of stereoscopic slide 1, derived from the stereo-camera, heretofore referred to, there is a housing preferably comprising a shallow oblong pan-shaped housing 8 and a detachable cover 7 for closure of the housing of the viewer, with a sloping roof 7', as shown in the top plan view in Figure 3. The internal mechanism and parts are illustrated in Figure 2 in plan view of the interior after the cover 7 has been removed.

The mounted slide 1 is inserted at its right end (as shown) into an opening at the end of the housing 8, and is guided and limited in its motion by a telescoping member 4. A convenient and effective method of illuminating the slides is shown in Figure 2, whereby a light bulb 15 is set into its socket 16 which is connected with a source of electric power, such as a flash-light battery placed within the hollow cylindrical handle 11 (shown in fraction).

The lighting system and circuit, 12, 13, 14, 14', 15, 16, are provided with a severable contact mechanism for automatically making and breaking the circuit at 14 and 14', the contact ends of which latter are normally kept apart by the action of the pressure springs 13A and 13B, while the free end of 14' is being forced into the empty slide-track by the inward pressure of 13B. These respective parts are so disposed that the light-circuit is closed when a picture-slide 1 has been advanced far enough into the slide-track to force the intruding disengaged end of 14' out of the slide-track and into contact engagement with the free end of 14, at the same time when the first pair of stereo-pictures 2 (say D' and D) has come into alignment with the openings 3 and thus into the line of vision through the lenses.

Parts of the wiring system may for convenience be mounted upon a block 12 composed of non-conducting material.

The twin viewing lenses and eye pieces 10 are mounted on tubes (not separately shown) which are telescoped within the tube sleeves 9, the latter being longitudinally slotted for the protrusion of the pair of racks 5'', integral with the slidable inner tubes, whereby the latter may be adjusted for focussing through the cooperative action of a pair of pinions and supporting rod 5' controlled by turning of the knob 5. For the further accommodation to the sight of different eye-spacings, as may be desirable, a slidable perforated disc (not shown in detail) may be placed behind either one of the twin eye-piece lenses and controlled in its inward and outward movement, as for instance by a bent arm 6' saddled over the shank of knurl-headed thumb-nut 6 riding on a threaded stem 6".

In order to obtain a maximum of well-dispersed light from the illuminating bulb 15, and for nonglaring light-transmission through the translucent film pictures 2, it is desirable that the inner aspect of the cover 7 be provided with a pair of reflecting panels (not shown) placed at appropriate angles according to known principles for the desired light-dispersing effect. The cover 7 is removably attached to the main body of the housing 8 as by insertion into a groove under a ledge 18 the other end being held in place by the pressure of a resilient member 17.

The stereoscope as actually illustrated in the drawings has been adapted in its specific structure for the showing of a slide which has been constructed as shown in the drawing of Figure 1, but it is obvious that various alterations in the dimensional relation and disposition of the various structural parts may be made without departing from the spirit and scope of the appended claims.

We claim:

1. A stereoscope for viewing transparent film pictures, comprising, in combination, twin viewing lenses mounted on the outer aspect of the base of an oblong pan-shaped housing, the said housing being provided with an internally contained slide-track running longitudinally through said housing and having a long dimension of sufficient amplitude for passage therethrough of an oblong picture-mounted slide provided with a plurality of sets of stereo-pairs ocularly spaced in alternating series, said track and slide lying in a plane normal to the line of vision through both the lenses; means for lighting the interior of the housing, comprising an electric-light lamp positioned within the housing behind the slide-track and so disposed that no rays from the lamp may impinge directly upon the slide pictures when they are in the line of vision through the lenses; a removable gable-roof shaped cover for closing the housing, and which, when in the closing position, is adapted to reflect and disperse the lamp-light from the inner surfaces of the oppositely positioned and angularly disposed slanting inner walls of the said cover; the said stereoscope being further characterized by means for automatically opening and closing the lamp-lighting circuit, such means comprising a normally broken circuit wherein one unjoined end of the wiring circuit is forced away from its circuit-closing contact-point and into the slide-track by a pressure spring, and being then so positioned within the said slide-track that it will in turn be forced out of the track by the counter-pressure produced by the passage of a picture-slide through the said track, and thus also forced simultaneously into circuit-contact with the other open end of the circuit.

2. A stereoscope, as described in claim 1, further characterized by having dependent from the body of the housing, a hollowed handle for containing means for supplying electric power to the internal lighting system, comprising a flash-light battery.

FRANKLIN H. AVERS.
EDWARD C. KREBS.

REFERENCES CITED

The following references are of record in the file of this patent:

UNITED STATES PATENTS

| Number | Name | Date |
| --- | --- | --- |
| 502,450 | Wagner | Aug. 1, 1893 |
| 570,279 | Dion | Oct. 27, 1896 |
| 722,851 | Kirkpatrick et al. | Mar. 17, 1903 |
| 731,405 | Dickson | June 16, 1903 |
| 1,189,308 | Sullivan | July 4, 1916 |
| 1,443,704 | Doxey | Jan. 30, 1923 |
| 1,462,351 | Michelsen | July 17, 1923 |
| 1,736,071 | Cressler | Nov. 19, 1929 |
| 1,859,665 | Golden et al. | May 24, 1932 |
| 1,930,421 | Ehmer | Oct. 10, 1933 |
| 2,019,748 | Tuttle | Nov. 5, 1935 |
| 2,122,649 | Kahn | July 5, 1938 |
| 2,271,530 | Wick | Feb. 3, 1942 |
| 2,336,288 | Peterson | Dec. 7, 1943 |
| 2,349,013 | Sparling | May 16, 1944 |